US007795172B2

(12) United States Patent
Foong et al.

(10) Patent No.: US 7,795,172 B2
(45) Date of Patent: Sep. 14, 2010

(54) LAYERED EXHAUST TREATMENT CATALYST

(75) Inventors: John S. Foong, Piscataway, NJ (US); Zhicheng Hu, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 1326 days.

(21) Appl. No.: 10/874,051

(22) Filed: Jun. 22, 2004

(65) Prior Publication Data

US 2005/0282701 A1 Dec. 22, 2005

(51) Int. Cl.
*B01J 23/00* (2006.01)
*B01J 21/00* (2006.01)
*B01J 20/00* (2006.01)
*B01J 29/00* (2006.01)

(52) U.S. Cl. ...................... 502/327; 502/302; 502/303; 502/304; 502/326; 502/332; 502/333; 502/334; 502/339; 502/349; 502/355; 502/415; 502/439; 502/527.13; 502/527.19

(58) Field of Classification Search ................ 502/302, 502/303, 304, 326, 327, 332, 333, 334, 339, 502/349, 355, 415, 439, 527.13, 527.19
See application file for complete search history.

(56) References Cited

U.S. PATENT DOCUMENTS 4,130,109 A * 12/1978 Brueck ...................... 126/685
4,134,860 A 1/1979 Hindin et al. .......... 252/466 PT
4,868,148 A 9/1989 Henk et al. ................ 502/303
4,923,842 A * 5/1990 Summers .................... 502/261
5,057,483 A 10/1991 Wan .......................... 502/304
5,376,610 A * 12/1994 Takahata et al. .............. 502/66
5,439,865 A * 8/1995 Abe et al. .................. 502/333
5,597,771 A 1/1997 Hu et al. .................... 502/304
5,888,464 A 3/1999 Wu et al. ................ 423/213.5
5,898,014 A 4/1999 Wu et al. .................... 502/302
5,948,723 A 9/1999 Sung .......................... 502/303
6,087,298 A 7/2000 Sung et al. .................. 502/333
6,107,240 A * 8/2000 Wu et al. .................... 502/304
6,248,688 B1 6/2001 Wu et al. .................... 502/302
6,294,140 B1 * 9/2001 Mussmann et al. ....... 423/213.5
6,306,794 B1 * 10/2001 Suzuki et al. ............... 502/304
6,348,430 B1 2/2002 Lindner et al.
6,350,416 B2 * 2/2002 Noda et al. ................. 422/171
6,497,851 B1 * 12/2002 Hu et al. .................. 423/213.5
6,764,665 B2 * 7/2004 Deeba et al. ............. 423/239.1
6,875,725 B2 * 4/2005 Lindner et al. ............. 502/328
6,923,945 B2 * 8/2005 Chen ....................... 423/239.1
7,276,212 B2 * 10/2007 Hu et al. ..................... 422/177
7,374,729 B2 * 5/2008 Chen et al. .................. 422/177
2002/0131914 A1 * 9/2002 Sung .......................... 422/177
2003/0100447 A1 * 5/2003 Deeba et al. ................ 502/339
2003/0207759 A1 * 11/2003 Nakamura et al. .......... 502/304
2004/0087439 A1 * 5/2004 Hwang et al. ............... 502/302
2004/0151645 A1 * 8/2004 Li .......................... 423/213.5
2004/0184978 A1 * 9/2004 Nakatsuji ................. 423/239.1
2004/0198595 A1 * 10/2004 Chen .......................... 502/328
2004/0209770 A1 * 10/2004 Nakatsuji .................... 502/302
2004/0254069 A1 * 12/2004 Ito ............................ 502/304
2005/0014638 A1 * 1/2005 Miura ........................ 502/304
2005/0170955 A1 * 8/2005 Nakamura et al. .......... 502/325
2005/0227867 A1 * 10/2005 Chen et al. .................. 502/325
2008/0016857 A1 * 1/2008 Hu et al. ...................... 60/299
2008/0226514 A1 * 9/2008 Chen et al. .................. 422/168
2009/0042722 A1 * 2/2009 Hu et al. ..................... 502/304

FOREIGN PATENT DOCUMENTS

EP 0 992 276 A1 4/2000
WO WO 92/09848 6/1992
WO WO 99/55459 11/1999
WO WO 03/028855 A1 4/2003
WO WO 03/035256 A2 5/2003

* cited by examiner

*Primary Examiner*—Cam N Nguyen
(74) *Attorney, Agent, or Firm*—Bronwen M. Loeb; Drinker Biddle & Reath

(57) ABSTRACT

A layered exhaust treatment catalyst comprising: (a) a carrier such as cordierite; (b) a first layer deposited on the carrier comprising a palladium metal component, a platinum metal component and an oxygen storage component such as ceria supported on a refractory metal oxide such as gamma-alumina; and (c) a second layer deposited on the first layer comprising a rhodium metal component, a platinum metal component and an oxygen storage component such as ceria supported on a refractory metal oxide such as gamma-alumina. Preferably, the catalyst also includes a bottom layer interposed between the carrier and the first layer. The bottom layer comprises an oxygen storage component such as ceria supported on a refractory metal oxide such as gamma-alumina. The amount of the oxygen storage component of the catalyst may be "tuned", i.e., adjusted, to meet the needs of a vehicle's on-board diagnostic ("OBD") catalyst efficiency monitoring system, without adversely affecting the performance of the catalyst.

10 Claims, No Drawings

LAYERED EXHAUST TREATMENT CATALYST

FIELD OF THE INVENTION

The invention relates to a layered three-way conversion ("TWC") exhaust treatment catalyst wherein the amount of the oxygen storage component of the catalyst may be "tuned", i.e., adjusted, to meet the needs of a vehicle's on-board diagnostic ("OBD") catalyst efficiency monitoring system, without adversely affecting the performance of the catalyst.

BACKGROUND OF THE INVENTION

Three-way conversion (TWC) catalysts have utility in a number of fields including the treatment of exhaust from internal combustion engines, such as automobile and other gasoline-fueled engines. Emissions standards for unburned hydrocarbons, carbon monoxide and nitrogen oxides contaminants have been set by various governments and must be met, for example, by new automobiles. In order to meet such standards, exhaust articles containing a TWC catalyst are located in the exhaust gas line of internal combustion engines, i.e., in the catalytic converter. The TWC catalysts promote the oxidation by oxygen in the exhaust gas of the unburned hydrocarbons and carbon monoxide and the reduction of nitrogen oxides to nitrogen.

Beginning with the 1994 model year, automotive manufacturers are required to implement systems that are designed to diagnose or detect malfunctioning emission related components on-board the vehicle. The set of regulations requiring these on-board diagnostic capabilities is commonly referred to as either OBD-I (On-Board Diagnostics-I for the 49 states) or OBD-II (On-Board Diagnostics-II for California). One component that the OBD system must diagnose is the catalytic converter. For those vehicles that are certified to meet the Clean Air Act standard of 0.25 g/mi tailpipe hydrocarbons ("THC"), the California OBD-II regulations call for the detection of malfunctioning catalysts (i.e., by illumination of the malfunction instrument light, "MIL") when THC emissions increase by more than 0.40 g/mi relative to the 4,000 mile emission level. The Federal OBD-I regulations also require that the MIL be illuminated when the THC increase by more than 0.40 g/mi but also specify that the THC emission threshold cannot exceed 0.60 g/mi.

Internal combustion engines produce exhaust gases having compositions that oscillate over time between air/fuel ("A/F") ratios that are slightly rich of stoichiometric and ratios that are slightly lean of stoichiometric. Ceria and other oxygen storage components are often included in automotive catalyst compositions to store oxygen when A/F ratios are lean of stoichiometric so that oxygen can be released when A/F ratios become rich to combust the unburned hydrocarbons and carbon monoxide. TWC catalysts are therefore characterized in one aspect with an oxygen storage capacity. As the TWC catalyst ages, however, its ability to store oxygen diminishes and the efficiency of the catalytic converter decreases. Based on this fact, current OBD systems in use today utilize linear air/fuel ratio sensors. Such sensors are typically referred to as exhaust gas oxygen sensors and are hereinafter referred to as "UEGO" if unheated and "HEGO" if heated. Typically, the UEGO will be located upstream of the catalyst and a HEGO and/or a UEGO will be located downstream of the catalyst to provide an estimate of a direct measurement of the oxygen storage capacity of the catalyst. Through calibration, this measurement of an estimate of the oxygen storage capacity of the catalyst can be related to the ability of the catalyst to convert the regulated exhaust gas emissions, i.e., the conversion efficiency of the catalyst. The catalyst deterioration can be therefore be monitored.

In particular, a typical method uses both UEGO and HEGO sensors that are electrochemical exhaust gas sensors, and their switching characteristics to ultimately monitor catalyst deterioration. The sensors detect whether the exhaust is rich or lean of stoichiometric. The method relies on measuring a ratio of the number of voltage level transitions (switches, e.g., across 0.5 volts) of two sensors, one placed upstream of the catalyst and one placed downstream of the catalyst. Contemporary catalytic converters have a significant oxygen storage capacity that dampens out the normal air/fuel cycling used in engine controller strategies. Therefore, the sensor placed upstream of the catalyst (measuring untreated exhaust from the engine) records a switch every time the exhaust gas moves from either a lean-to-rich or rich-to-lean state. The sensor mounted downstream of the catalyst, however, does not record a switch every time the upstream sensor switches, because the oxygen storage capacity of the catalyst acts as an integrator, smoothing out the A/F oscillations. As the catalyst deteriorates because of aging, the oxygen storage capacity of the catalyst decreases and therefore the downstream sensor records more switches. By monitoring the downstream sensor and upstream sensor switching transitions for a long period and ratioing the number of switching transitions, a parameter referred to as the switch ratio is obtained. This switch ratio is an indicator of the oxygen storage capacity of the catalyst. This switch ratio is then used as a diagnostic parameter for determining the pollutant conversion efficiency of the catalyst.

The amount of oxygen storage capacity that different vehicle original equipment manufacturers ("OEM"s) require for various exhaust platforms is dependent on a number of factors including engine displacement, vehicle type, catalyst volume, catalyst location and engine management and can vary greatly according to the particulars of a vehicle and its associated exhaust platform. Alteration of the oxygen storage capacity of typical catalysts, however, can alter the catalysts' characteristics including their conversion efficiency.

In addition to meeting on board diagnostic monitoring requirements, catalysts preferably meet requirements for efficiently using platinum group metals as catalytic agents due to the high cost of these metals. Strategies that have been used to optimize conversion efficiency with minimized platinum group metal usage include the use of zoned, gradient zoned and layered catalyst composites. Examples of the use of layers are disclosed in U.S. Pat. No. 5,597,771, while the use of zones is described in co-pending U.S. application Ser. No. 09/067,820 and WO 92/09848. Segregation of precious metals, such as platinum group metals, into layers and zones permits more control of the physical and chemical environment in which the individual precious metal components operate. For example, the catalytic activity of precious metal components are often more effective when in close proximity to certain promoters or other additives. In other instances to improve hydrocarbon combustion efficiency during cold starts, it is preferable to have high concentrations of certain catalytic agents such as palladium in frontal or upstream zones of the catalyst so that the exhaust gases contact these catalytic agents immediately and combustion of these pollutants can begin at low temperatures, as disclosed in U.S. Pat. No. 6,087,298.

The catalytic layers and zones are formed from washcoat compositions typically containing at least a refractory oxide support such as activated alumina and one or more platinum group metal ("PGM") components such as platinum or palladium, rhodium, ruthenium and iridium. Other additives including promoters and washcoat stabilizers are often added. The washcoat compositions are deposited on a suitable carrier or substrate such as a monolithic carrier comprising a refractory ceramic honeycomb or a metal honey-comb structure, or refractory particles such as spheres or short, extruded segments of a suitable refractory material.

Optimization of a catalyst so that it meets regulatory requirements for minimization of pollutants and durability, as well as an automobile manufacturer's requirements for precious metal usage and oxygen storage capacity for a given vehicle/exhaust platform, often requires extensive experimentation. The experimentation can include iterative reformulation of catalyst compositions and various layer or zone combinations followed by performance testing. It is often the case that the final optimized formulation of a one catalyst that successfully meets the requirements of one exhaust platform having a specific oxygen storage capacity requirement, cannot be used for a different exhaust platform having a different oxygen storage capacity requirement without extensive reformulation and performance testing. It would be preferable from the standpoint of both time and expense to have a more adaptable catalyst. Once having optimized a catalyst for catalyst performance and precious metal usage, it would be particularly desirable to be able to alter only the oxygen storage capacity of the catalyst without altering the performance requirements so that it can be used for different exhaust platforms, all having different OSC requirements.

DETAILS OF THE INVENTION

The layered exhaust treatment catalyst of the invention allows for the alteration of the oxygen storage capacity of the catalyst without impairing the three-way conversion capability of the catalyst. The layered exhaust treatment catalyst comprises:

(a) a carrier;

(b) a first layer deposited on the carrier, said first layer comprising a palladium metal component, a platinum metal component and an oxygen storage component supported on a refractory metal oxide, the ratio of the palladium metal component to the platinum metal component being in the range of about 5:1 to about 200:1; and (c) a second layer deposited on the first layer comprising a rhodium metal component, a platinum metal component and an oxygen storage component supported on a refractory metal oxide, the ratio of the rhodium metal component to the platinum metal component being in the range of about 5:1 to about 30:1.

Preferably, a bottom layer comprising an oxygen storage component supported on a refractory metal oxide is interposed between the carrier and the first layer. Typically, the oxygen storage component will be present in first layer, second layer and the bottom layer in an amount of about 0.2 to about 2.0 g/in$^3$. The amount of the oxygen storage component in a particular layer may be the -same as, or differ, from the amount in a different layer.

The oxygen storage component in the first layer, second layer and bottom layer may be baria, ceria, lanthania, praseodymia, a ceria-praseodymia composite, a ceria-praseodymia-zirconia composite, a ceria-praseodymia-zirconia-neodymia composite or a ceria-lanthania-praseodymia-zirconia-neodymia composite. The oxygen storage component selected for a particular layer need not be the same as that selected for a different layer.

The refractory metal oxide employed in the first layer, second layer and bottom layer may be alumina, zirconia, a mixture of alumina with zirconia and/or ceria or ceria coated on alumina. Preferably, the refractory metal oxide is gamma-alumina. The refractory metal oxide selected for a particular layer need not be the same as that selected for a different layer. Typically, the refractory metal oxide support will be employed in each layer in an amount of about 0.1 to about 2.0 g/in$^3$.

Preferably, the total amount of palladium metal component and platinum metal component in the first layer is in the range of about 10 to about 60 g/ft$^3$. It is also preferred that the total amount of rhodium metal component and platinum metal component in the second layer be in the range of about 2 to about 15 g/ft$^3$.

Any suitable carrier can be employed, such as a monolithic carrier of the type having a plurality of fine, parallel gas flow passages extending therethrough from an inlet or an outlet face of the carrier, so that the passages are open to fluid flow therethrough (also known as honeycomb carriers). The passages arc essentially straight from their fluid inlet to their fluid outlet and are defined by walls. The flow passages of the monolithic carrier are thin-walled channels that can be of any suitable cross-sectional shape and size, such as trapezoidal, rectangular, square, sinusoidal, hexagonal, oval or circular, but typically, the flow passages have a hexagonal, rectangular or square shape. Such structures can contain from about 60 to about 1200 or more gas inlet openings ("cells") per square inch of cross section. Carriers can be of the ceramic type or of the metallic type.

The ceramic carrier can be made of any suitable refractory material, e.g., cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as titanium, stainless steel or other suitable iron based corrosion resistant alloys. The preferred carrier is cordierite.

The several layers of the catalyst can be deposited onto the carrier and onto each other by any method known to those of ordinary skill in the art and will typically be applied in the form of washcoats. On an overall basis, the carrier will comprise about 40 to about 80% by weight of the total weight of the catalyst, the bottom layer (if present) will comprise about 5 to about 15% by weight of the total weight of the catalyst, the first layer will comprise about 15 to about 35% by weight of the total weight of the catalyst and the second layer will comprise about 5 to about 30% by weight of the total weight of the catalyst.

The bottom layer (if present) comprises at least one oxygen storage component, preferably an oxide of cerium or praseodymium or a composite thereof, with the most preferred oxygen storage component being ceria. Preferably, the oxygen storage component is employed in bulk form. By bulk form, it is meant that a composition is in a solid form, preferably as fine particles that can be 1-15 microns in diameter or smaller. Preferably, the oxygen storage component is present in at least 2% by weight, more preferably at least 5% by weight of the bottom layer, with the balance being the selected refractory metal oxide support, e.g., a gamma-alumina having a BET surface area of about 40 to about 400 m$^2$/g. Preferably, ceria serves as the bottom layer oxygen storage component and comprises between about 5 and 100% by weight of the total oxygen storage components in the bottom layer. When praseodymia is used, it is preferably used in combination with, but not limited to, ceria and can amount to up to about 8% by weight of the total oxygen storage component content of the bottom layer. In a typical preparation, a mixture of the selected oxygen storage component, e.g., ceria, and the selected refractory metal oxide support, e.g., gamma-alumina, and a suitable vehicle, preferably water, are ball-milled for a suitable time to obtain about 90% of the particles having a particle size of less than about 20 microns, preferably less than about 10 microns. The ball-milled composition can be combined with the vehicle in an amount of about 30 to about 50 wt. % solids.

The oxygen storage component-refractory metal oxide composition can be deposited onto the carrier to form the bottom layer by any method known to those skilled in the art. The bottom layer composition may be deposited on the carrier in any desired amount within the parameters set forth above as to the weight percentage of the bottom layer in respect to the overall weight of the catalyst. The amount of the bottom layer composition may be controlled, e.g., by adjusting the percent solids of the coating slurry. For example, in one embodiment, a washcoat having about 32 to about 35 wt. % solids will result in a concentration of about 1 g/in$^3$ of the bottom layer, when deposited on the carrier.

The bottom layer deposited on the carrier is generally formed as a coating over most, if not all, of the surfaces of the carrier contacted. The combined structure is thereafter calcined at a temperature of about 400 to about 550° C. for about 1 to about 2 hours.

The first and second layers of the catalyst are typically formed from catalytic washcoat compositions containing the selected platinum group metal ("PGM") components, the selected oxygen storage components and the selected refractory metal oxide supports.

In the first layer, the PGM components will comprise a palladium metal component and a platinum metal component, an oxygen storage component such as ceria and a refractory metal oxide support such as a gamma-alumina. Typically, the PGM components will comprise about 0.5 to about 2.0 wt. %, the selected oxygen storage component(s) will comprise about 30 to about 60 wt. % and the selected refractory metal oxide support will comprise about 20 to about 80 wt. % of the first layer composition.

The several first layer composition components together with a suitable vehicle, preferably water, are ball-milled for a suitable time to obtain about 90% of the particles having a particle size of less than about 20 microns, preferably less than about 10 microns. The ball-milled composition can be combined with the vehicle in an amount of about 30 to about 50 wt. % solids.

The first layer composition can be deposited onto the carrier (or onto the bottom layer if used) to form the first layer by any method known to those skilled in the art. The first layer composition may be deposited onto the carrier (or onto the bottom layer if used) in any desired amount within the parameters set forth above as to the weight percentage of the first layer in respect to the overall weight of the catalyst. The amount of the first layer composition may be controlled, e.g., by adjusting the percent solids of the coating slurry. For example, in one embodiment, a washcoat having about 30 to about 45 wt. % solids will result in a concentration of about 2 g/in$^3$ of the first layer, when deposited onto the carrier (or onto the bottom layer if used).

The first layer composition deposited onto the carrier (or onto the bottom layer if used) is generally formed as a coating over most, if not all, of the surfaces of the carrier (or bottom layer if used) contacted. The combined structure is thereafter calcined at a temperature of about 400 to about 550° C. for about 1 to about 2 hours.

In the second layer, the PGM components will comprise a rhodium metal component and a platinum metal component, an oxygen storage component such as ceria and a refractory metal oxide support such as a gamma-alumina. Typically, the PGM components will comprise about 0.2 to about 1.2 wt. %, the selected oxygen storage component(s) will comprise about 30 to about 80 wt. % and the selected refractory metal oxide support will comprise about 5 to about 70 wt. % of the second layer composition.

The several second layer composition components together with a suitable vehicle, preferably water, are ball-milled for a suitable time to obtain about 90% of the particles having a particle size of less than about 20 microns, preferably less than about 10 microns. The ball-milled composition can be combined with the vehicle in an amount of about 30 to about 50 wt. % solids.

The second layer composition is generally formed as a coating over most, if not all, of the surfaces of the first layer contacted. The combined structure is thereafter calcined at a temperature of about 400 to about 550° C. for about 1 to about 2 hours.

As will be apparent to those of ordinary skill in the art, the PGM components, acting as catalytic agents, can exist in the catalyst in multiple oxidation states while in use. By way of example, a palladium component can exist as palladium metal (0), Pd (II), and Pd (IV) in the catalyst. In a preferred method of preparing the catalyst, a platinum group metal component such as a suitable compound and/or complex of the platinum group metals can be utilized to achieve dispersion of the catalytic component on a support, e.g., gamma-alumina support particles.

It should be understood that the term "PGM" means any platinum group metal compound, complex, or the like which, upon calcination or use of the catalyst decomposes or otherwise converts to a catalytically active form, usually, the metal or the metal oxide. Water soluble compounds or water dispersible compounds or complexes of PGMs can be utilized as long as the liquid used to impregnate or deposit the catalytic metal compounds onto support particles does not adversely react with the catalytic metal or its compound or complex or the other components of the catalyst composition and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds of the platinum group metals are preferred. For example, suitable compounds are chloroplatinic acid, amine solubilized platinum hydroxide, palladium nitrate or palladium chloride, rhodium chloride, rhodium nitrate, hexamine rhodium chloride, and the like. During the calcination step, or at least during the initial phase of use of the catalyst, such compounds are converted into a catalytically active form of the platinum group metal or a compound thereof.

The catalytic washcoats employed in the present invention can be made by any suitable method. One preferred method includes preparing a mixture of the water-soluble or dispersible, PGM components and a finely divided, high surface area, porous refractory metal oxide which is sufficiently dry to absorb essentially all of the solution during impregnation to form supported PGM components. If more than one PGM component is used in the catalytic washcoat composition, the additional PGM component can be supported on the same or different refractory oxide particles as the first PGM component by the same impregnation method in sequence or in parallel.

The supported PGM components are then added to water along with the selected oxygen storage component(s) and the selected refractory metal oxide, and comminuted by a ball mill or other suitable equipment to form a slurry. Preferably, the slurry is acidic, having a pH of less than 7 and preferably from 3 to 7. The pH is preferably lowered by the addition of an acid, preferably acetic or nitric acid, to the slurry. In preferred embodiments, the catalytic washcoat slurry is comminuted to result in substantially all of the solids having particle sizes of less than 10 or 15 micrometers in average diameter. The platinum group components and as well additives provided in soluble form in the catalytic layer are converted to a water insoluble form chemically or by calcining. The first and second layers are preferably dried and calcined as indicated above.

Alternatively, each layer of the present catalyst can also be prepared by the method disclosed in U.S. Pat. No. 4,134,860 (incorporated by reference) generally recited as follows. A finely-divided, high surface area, refractory metal oxide support is contacted with a solution of a water-soluble, PGM component to provide a mixture which is essentially devoid of free or unabsorbed liquid. The platinum group metal component of the solid, finely divided mixture can be converted at this point in the process into an essentially water-insoluble form while the mixture remains essentially free of unabsorbed liquid. This process can be accomplished by employing a refractory metal oxide support, e.g., alumina, including stabilized aluminas, which is sufficiently dry to absorb essentially all of the solution containing the platinum group metal component, i.e., the amounts of the solution and the support, as well as the moisture content of the latter, are such that their mixture has an essential absence of free or unabsorbed solution when the addition of the platinum group metal component is complete. During the latter conversion or fixing of the catalytically promoting metal component on the support, the composite remains essentially dry, i.e., it has substantially no separate or free liquid phase.

The mixture containing the fixed, platinum group metal component can be comminuted as a slurry which is preferably acidic, to provide solid particles that are advantageously primarily of a size of up to about 5 to 15 microns. The resulting washcoat slurry is deposited on the second layer that has been coated on the bottom layer or on a previously applied catalytic layer. The composite is then dried and can be calcined. When more than one catalytic washcoat is applied, each washcoat can be sequentially applied and calcined to form layered composites of the present invention. In order to deposit a plurality of catalytic washcoat slurries on a macro sized carrier, one or more comminuted slurries are applied to the second layer in any desired manner. Thus, the carrier coated with the first and second layers can be dipped one or more times in the catalytic washcoat slurry, with intermediate drying if desired, until the appropriate amount of slurry is on the carrier. The slurry employed in depositing the supported platinum group metal component-high area support composite on the carrier will often contain about 15 to 60 weight percent of finely divided solids, preferably about 25 to 50 weight percent. Preferred methods for preparing zone-coated carriers are described in co-pending U.S. application Ser. No. 09/873,979 filed Apr. 28, 1998, the disclosure of which is incorporated by reference herein.

The following nonlimiting examples shall serve to illustrate the various embodiments of the invention. Unless otherwise indicated, all parts and percentages are on a weight basis.

EXAMPLE 1

Catalyst Preparation

A layered exhaust treatment catalyst was prepared in the following manner: A cylindrical cordierite honeycomb substrate was used as the carrier. The carrier had a diameter of 3.66 inches, a length of 4.65 inches and a total volume of 48.8 $in^3$. The total PGM content of the catalyst was 50 g/$ft^3$. In the first layer, the palladium metal component was present in the amount of 37 g/$ft^3$.

A bottom layer was applied to the surface of the carrier by immersing the carrier in a 30 wt. % solid content aqueous slurry containing 28.3 wt. % gamma-alumina, and 47.2 wt. % of Ce/Zr composite material as the oxygen storage component. The slurry was has previously been milled to less than 10 microns of 90% of the all the particles. The thus-coated carrier was then calcined at 430° C. for 2 hours to obtain a dried washcoat at approximately 1.06 g/$in^3$.

A first layer in the form of an aqueous slurry was then applied to the surface of the coated carrier. The slurry contained 1.05 g of palladium impregnated as palladium nitrate solution by a planetary mixer into a combination of 19.5 g of gamma-alumina and 53.7 g of Ce/Zr composite material as the oxygen storage component. The slurry was milled in a ball mill such that 90% of all particles are less than 10 microns. 0.0098 g of platinum was added as a platinum nitrate solution via a planetary mixer into the slurry. The resultant carrier was then calcined at 430° C. for 2 hours to obtain a dried washcoat at approximately 2.095 g/$in^3$.

A second layer was then applied to the surface of the coated carrier in the form of an aqueous slurry. The slurry contained 0.17 g of rhodium impregnated as rhodium nitrate solution by a planetary mixer into a combination of 17.1 g of gamma-alumina, 43.9 g of Ce/Zr composite material as the oxygen storage component was milled as described above. 0.098 g of platinum was mixed into the slurry as a platinum amine solution by a planetary mixer. The resultant carrier was then calcined at 430° C. for 2 hours to obtain a dried washcoat at approximately 1.315 g/$in^3$.

EXAMPLE 2

Test Protocol

The layered exhaust treatment catalyst of Example 1 was evaluated in accordance with the following test procedure:

Aging: The sample was aged in furnace at 1050 C for 5 hours in an atmosphere containing nitrogen and 10% steam.

Oxygen storage capacity measurement: The oxygen storage capacity of a sample was conduct in bench reactor. A sample with a dimension of 1"diameter and 3" long was mounted into a high-temperature metal alloy tubular reactor. The temperature of the reactor was raised to 450 C. A gas mixture pulse containing 1% $O_2$ and 99% $N_2$ was sent to the reactor for 10 seconds, followed by a pulse of a gas mixture containing 2% of CO and 98% $N_2$ for another 10 seconds. The overall hourly space velocity was set at 64,000. This process was repeated 8 times. $CO_2$ generated from the process was measured with a mass spectrometer, and the oxygen storage capacity was calculated from the amount of CO generated per cycle and expressed as mmol/L.

EXAMPLE 3

Test Results

| Sample | Precious Metal Loading | Ratio: Pd/Pt/Rh | Oxygen Storage Capacity, mmol/L |
|---|---|---|---|
| A (10) | 10 | 0/4/6 | 7.0 |
| A (60) | 60 | 0/54/6 | 19.0 |
| B (15) | 15 | 5/5/5 | 14.5 |
| B (17.5) | 17.5 | 7.5/5/5 | 24.4 |
| B (50) | 50 | 7/37/6 | 35.9 |
| C | 15 | 10/0/5 | 32.2 |
| D | 15 | 5/5/5 | 14.6 |

What is claimed is:

1. A layered exhaust treatment catalyst comprising (a) a carrier;

(b) a bottom layer deposited on the carrier, said bottom layer consisting essentially of an oxygen storage component supported on a refractory metal oxide;

(c) a first layer deposited on the bottom layer, said first layer comprising a palladium metal component, a platinum metal component and an oxygen storage component supported on a refractory metal oxide, the ratio of the palladium metal component to the platinum metal component being in the range of about 5:1 to about 200:1; and (d) a second layer deposited on the first layer comprising a rhodium metal component, a platinum metal component and an oxygen storage component supported on a refractory metal oxide, the ratio of the rhodium metal component to the platinum metal component being in the range of about 5:1 to about 30:1, wherein the oxygen storage component in the bottom layer, first layer and second layer is independently selected from the group consisting of ceria, lanthania, praseodymia, a ceria-praseodymia composite, a ceria-praseodymia-zirconia composite, a ceria-praseodymia-zirconia-neodymia composite and a ceria-lanthania-praseodymia-zirconia-neodymia composite.

2. The catalyst of claim 1 wherein the oxygen storage component is present in the bottom layer, the first layer and the second layer in an amount of about 0.2 to about 2.0 g/in$^3$.

3. The catalyst of claim 1 wherein the refractory metal oxide in the bottom layer, the first layer and the second layer is independently selected from the group consisting of alumina, zirconia, mixtures of alumina with zirconia and/or ceria, and ceria coated on alumina.

4. The catalyst of claim 1 wherein the refractory metal oxide employed in the bottom layer, the first layer and the second layer comprises gamma-alumina.

5. The catalyst of claim 1 wherein the total amount of palladium metal component and the platinum metal component in the first layer is in the range of about 10 to about 60 g/ft$^3$.

6. The catalyst of claim 1 wherein the total amount of rhodium metal component and platinum metal component in the second layer is in the range of about 2 to about 15 g/ft$^3$.

7. The catalyst of claim 1 wherein the carrier comprises a ceramic or metallic monolith.

8. The catalyst of claim 7 wherein the carrier comprises cordierite.

9. A layered exhaust treatment catalyst comprising:

(a) a carrier;

(b) a bottom layer disposed on the carrier, said bottom layer consisting essentially of an oxygen storage component supported on a refractory metal oxide;

(c) a first layer disposed on the bottom layer, said first layer comprising a palladium metal component, a platinum metal component and an oxygen storage component supported on a refractory metal oxide, the ratio of the palladium metal component to the platinum metal component being in the range of about 5:1 to about 20:1 and (d) a second layer disposed on the first layer comprising a rhodium metal component, a platinum metal component and an oxygen storage component supported on a refractory metal oxide, the ratio of the rhodium metal component to the platinum metal component being in the range of about 5:1 to about 20:1.

10. The catalyst of claim 9 wherein the oxygen storage component is in the bottom layer, the first layer and the second layer in an amount of about 0.2 to about 2.0 g/in$^3$.

* * * * *